United States Patent
Chang

(10) Patent No.: US 8,177,377 B2
(45) Date of Patent: *May 15, 2012

(54) OPTICAL PLATE AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 586 days.

This patent is subject to a terminal disclaimer.

(21) Appl. No.: 12/319,006

(22) Filed: Dec. 31, 2008

(65) Prior Publication Data

US 2010/0008062 A1  Jan. 14, 2010

(30) Foreign Application Priority Data

Jul. 10, 2008 (CN) .......................... 2008 1 0302679
Jul. 10, 2008 (CN) .......................... 2008 1 0302684

(51) Int. Cl.
*F21V 13/04* (2006.01)
*F21V 5/02* (2006.01)

(52) U.S. Cl. ....... 362/97.1; 362/309; 362/333; 359/625; 359/831

(58) Field of Classification Search ................. 362/327, 362/329, 339, 330, 333, 97.1, 97.2, 301, 362/309, 244, 246; 359/625, 640, 831, 837
See application file for complete search history.

(56) References Cited

U.S. PATENT DOCUMENTS

| 7,445,361 | B1 * | 11/2008 | Hsu et al. ...................... 362/333 |
| 7,715,132 | B2 * | 5/2010 | Chang ............................ 359/831 |
| 7,929,213 | B2 * | 4/2011 | Chang ............................ 359/625 |
| 2005/0007793 | A1 * | 1/2005 | Yoshida et al. ................ 362/558 |
| 2008/0117515 | A1 * | 5/2008 | Hsu et al. ...................... 359/599 |
| 2009/0073676 | A1 * | 3/2009 | Hsu et al. ..................... 362/97.1 |

* cited by examiner

*Primary Examiner* — Thomas Sember
(74) *Attorney, Agent, or Firm* — Altis Law Group, Inc.

(57) ABSTRACT

An optical plate includes a first surface and a second surface opposite to the first surface. The first surface defines a plurality of elongated, arc-shaped depressions. The second surface defines a plurality of triangular pyramidal depressions and a plurality of four-sided pyramidal depressions. Each four-sided pyramidal depression is surrounded by four triangular pyramidal depressions.

18 Claims, 12 Drawing Sheets

OPTICAL PLATE AND BACKLIGHT MODULE USING THE SAME

CROSS-REFERENCE TO RELATED APPLICATIONS

This application is related to five co-pending U.S. patent applications, which are: application Ser. No. 12/319,007, filed on Dec. 31, 2008, and entitled "OPTICAL PLATE AND BACKLIGHT MODULE USING THE SAME"; Ser. No. 12/319,046 filed on Dec. 31, 2008, and entitled "DIFFUSION PLATE AND BACKLIGHT MODULE USING SAME"; Ser. No. 12/319,045, filed on Dec. 31, 2008 and entitled "OPTICAL PLATE HAVING TRIANGULAR PYRAMIDAL DEPRESSIONS AND BACKLIGHT MODULE USING THE SAME" Ser. No. 12/319,042, filed on Dec. 31, 2008, and entitled "OPTICAL PLATE AND BACKLIGHT MODULE USING THE SAME"; and Ser. No. 12/317,990, filed on Dec. 31, 2008, and entitled "OPTICAL PLATE WITH V-SHAPED PROTRUSIONS ON BOTH SIDES AND BACKLIGHT MODULE USING THE SAME". In the co-pending applications, the inventor is Shao-Han Chang. The co-pending applications have the same assignee as the present application. The disclosure of the above identified applications is incorporated herein by reference.

BACKGROUND

1. Technical Field

The present disclosure relates to an optical plate and a backlight module using the optical plate.

2. Description of the Related Art

Referring to FIGS. 10 and 11, a direct backlight module 100 includes a frame 11, a plurality of light sources 12, a light diffusion plate 13, and a prism sheet 10. The light sources 12 are positioned in an inner side of the frame 11. The light diffusion plate 13 and the prism sheet 10 are positioned on the light sources 12 above a top of the frame 11 in that order.

The light diffusion plate 13 includes a plurality of diffusion particles (not shown) to scatter light. The prism sheet 10 includes a transparent substrate 101 and a prismatic layer 103 formed on the transparent substrate 101. The prismatic layer 103 forms a plurality of elongated V-shaped protrusions 105.

In use, light emitted from the light sources 12 enters into the light diffusion plate 13 and becomes scattered. The scattered light leaves the diffusion plate 13 to the prism sheet 10. The scattered light then travels through the prism sheet 10, and is refracted out of at the elongated V-shaped protrusions 105 and concentrated by the elongated V-shaped protrusions 105, thus enhancing an illumination of the backlight module 100 within a predetermined view angle.

However, although light from the light sources 12 enters the diffusion plate 13 and becomes scattered, after the light leaves the prism sheet 10, strong light spots of the light sources 12 directly above the light sources 12 are often formed. Therefore, an upper diffusion film 14 may be positioned on the prism sheet 10 to reduce or eliminate light spots of the light sources 12. However, although the upper light diffusion film 14 and the prism sheet 10 are in contact with each other, a plurality of air pockets may still exist around the boundaries of the light diffusion film 14 and the prism sheet 10. When the backlight module 100 is in use, light passes through the air pockets, and some of the light undergoes total reflection by the air pockets along one or more corresponding boundaries. In addition, the upper light diffusion film 14 may absorb a certain amount of the light from the prism sheet 10. As a result, a brightness of light illumination of the backlight module 100 is reduced.

Therefore, an optical plate and a backlight module using the optical plate are desired in order to overcome the above-described shortcoming.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
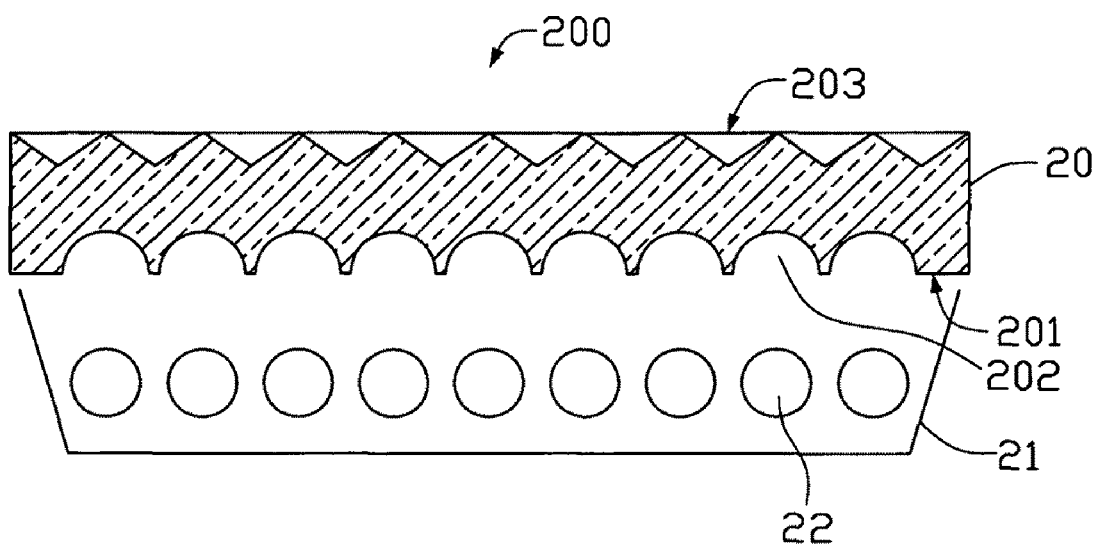
FIG. 1 is a cross-sectional view of a first embodiment of an optical plate used in an embodiment of a backlight module.

Referring to FIG. 1, a first embodiment of a backlight module 200 includes an optical plate 20, a frame 21, and a plurality of light sources 22 positioned in an inner side of the frame 21. The interior of the frame may be highly reflective. The optical plate 20 includes a first surface 201 and a second surface 203 opposite to the first surface 201. The optical plate 20 is positioned on the frame 21 above the light sources 22 such that the first surface 201 faces the light sources 22.

Figure 2:
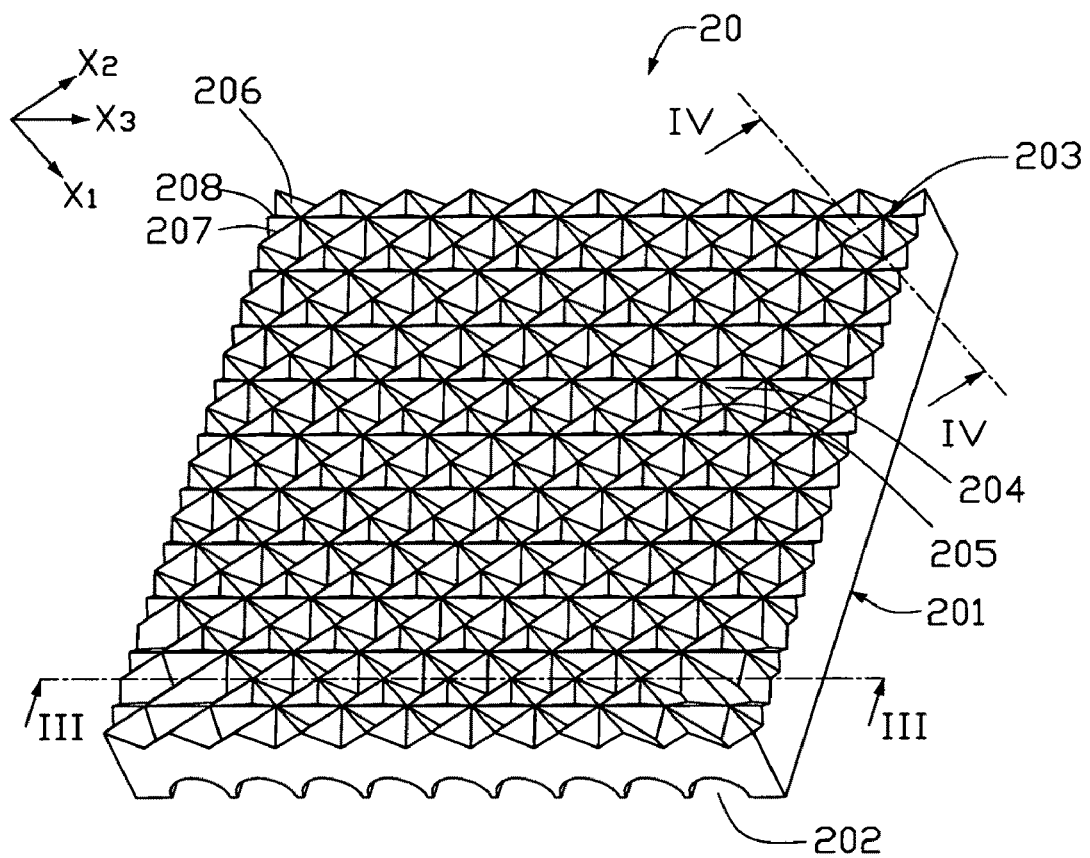
FIG. 2 is an isometric view of the optical plate in FIG. 1.
Figure 3:
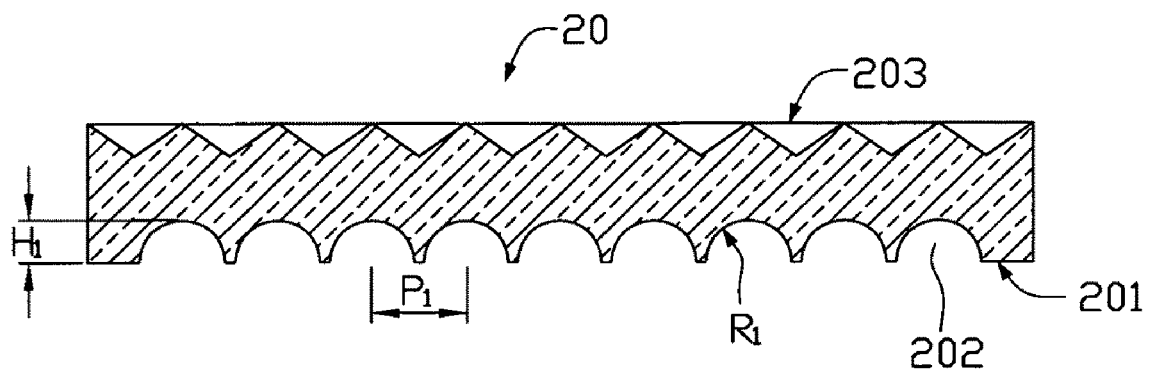
FIG. 3 is a cross-sectional view of the optical plate taken along the line III-III in FIG. 2.

Referring to FIGS. 2 and 3, the first surface 201 defines a plurality of elongated, arc-shaped depressions 202. The second surface 203 defines a plurality of four-sided pyramidal depressions 205. The transparency of the optical plate 20 may be determined according to the visible light spectrum.

The elongated, arc-shaped depressions 202 are aligned side by side on the first surface 21 of the optical plate 20. Each of the elongated, arc-shaped depressions 202 has a semi-circular cross-section taken along a direction perpendicular to the extending direction thereof. A pitch $P_1$ between adjacent elongated, arc-shaped depressions 202 is about 0.025 millimeters (mm) to about 1.5 mm. A radius $R_1$ of a circular arc defined by the semi-circular cross section taken along a direction perpendicular to the extending direction of the elongated, arc-shaped depressions 202 is equal to or lager than 0.01 mm, and less than 3 mm. A depth $H_1$ of each elongated, arc-shaped depression 22 is equal to or larger than 0.01 mm, and less than 3 mm.

The four-sided pyramidal depressions 205 are closely connected. Corresponding sidewalls on each side of adjacent four-sided pyramidal depressions 205 sharing a same edge, collectively form a plurality of first V-shaped ridges 206 and a plurality of second V-shaped ridges 207. The first V-shaped ridges are aligned in a first direction $X_1$. The second V-shaped ridges are aligned in a second direction $X_2$. In addition, a plurality of third V-shaped ridges 208 aligned in a third direction $X_3$ are formed on the first surface 201. Each third V-shaped ridge passes through intersections of the first V-shaped ridges 206 and the second V-shaped ridges 207. As a result, each corresponding four-sided pyramidal depression 205 is partitioned into two triangular pyramid depressions 204 such that each four-sided pyramidal depression 205 is surrounded by four triangular pyramidal depressions 204.

In the illustrated embodiment, four corners of a square base of each four-sided pyramidal depression 205 intersect with a corner of square bases of the four adjacent four-sided pyramidal depressions 205. Four edges of the bottom of each four-sided pyramidal depression 205 overlap with four edges of the bottoms of four adjacent triangular pyramidal depressions 204 such that each four-sided pyramidal depression 205 is surrounded by four triangular pyramidal depressions 204.

In the illustrated embodiment, an angle defined by the first direction $X_1$ and the second direction $X_2$ is about 90 degrees, and an angle defined by the first direction $X_1$ and the third direction $X_3$ is about 45 degrees.

Figure 4:
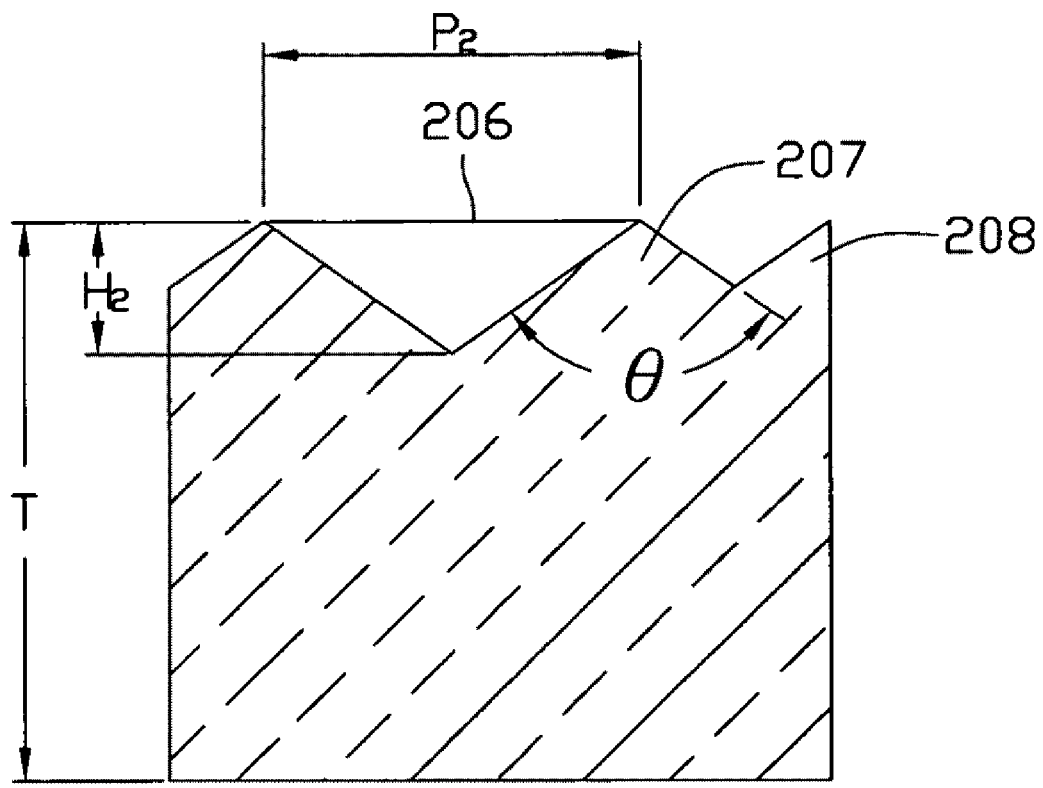
FIG. 4 is a cross-sectional view of the optical plate taken along the line IV-IV in FIG. 2.

Referring to FIG. 4, a vertex angle θ of the second V-shaped ridges 207 is about 80 degrees to about 100 degrees, and a pitch $P_2$ of adjacent second V-shaped ridges 207 is about 0.025 mm to about 1 mm. Additionally, the vertex angle θ may be adjusted such that a view angle thereof can be adjusted.

It may be appreciated that parameters of the first V-shaped ridges 206 and the third V-shaped ridges 208, such as vertex angle and pitch, can be the same as or different from parameters of the second V-shaped ridges 207. In the illustrated embodiment, the vertex angle and the pitch of the first V-shaped ridges 206 and the third V-shaped ridges 208 are the same as the second V-shaped ridges 207.

A height $H_2$ of the second V-shaped ridges 207, a height of the first V-shaped ridges 206, and a height of the third V-shaped ridges 208 may be substantially equal to or different from each other. For example, a top of the first V-shaped ridges 206, a top of the second V-shaped ridges 207, and a top of the third V-shaped ridges 208 are in a same plane.

A thickness T of the optical plate 20 is about 0.4 mm to about 4 mm. The optical plate 20 may be made of a material selected from the group consisting of polycarbonate, polymethyl methacrylate, polystyrene, copolymer of methyl methacrylate and styrene, and any suitable combination of those.

In use, light enters the optical plate 20 via the first surface 201. Because each inner surface of the elongated, arc-shaped depressions 202 is bended, and inner surfaces of the four-sided pyramidal depressions 205 and inner surface of the triangular pyramidal depressions 204 are slanted, incident light that may have been internally reflected on a flat surface, are refracted, reflected, and diffracted. As a result, light outputted from the second surface 203 is more uniform than light outputted from a light output surface of a typical prism sheet. Since strong light spots of the light sources seldom or do not occur, an extra upper light diffusion film on the optical plate 20 is unnecessary. Thus, the efficiency of light utilization is enhanced.

Referring to the Table 1 below, test samples are provided.

TABLE 1

| Test samples | Condition |
|---|---|
| 1 | LED |
| 2 | LED+ prism sheet 10 |
| 3 | LED+ optical plate 20 |

Figure 5:
FIG. 5 is a photo showing an illumination distribution testing light of an LED.
Figure 6:
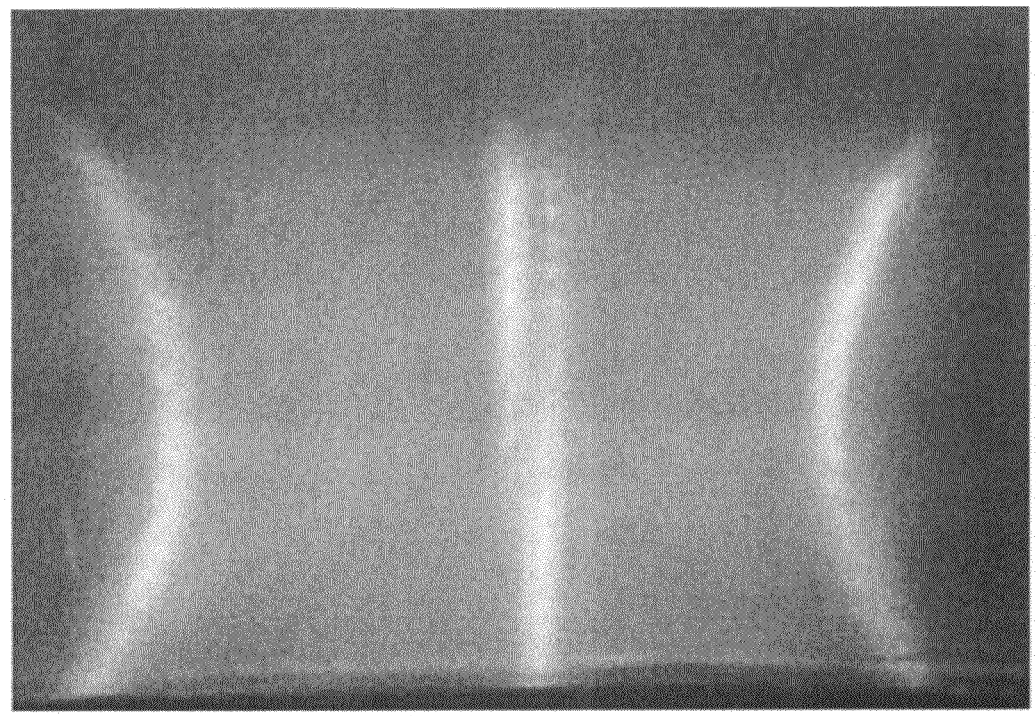
FIG. 6 is a photo showing an illumination distribution testing light of an LED passing through the optical plate of FIG. 2.
Figure 12:
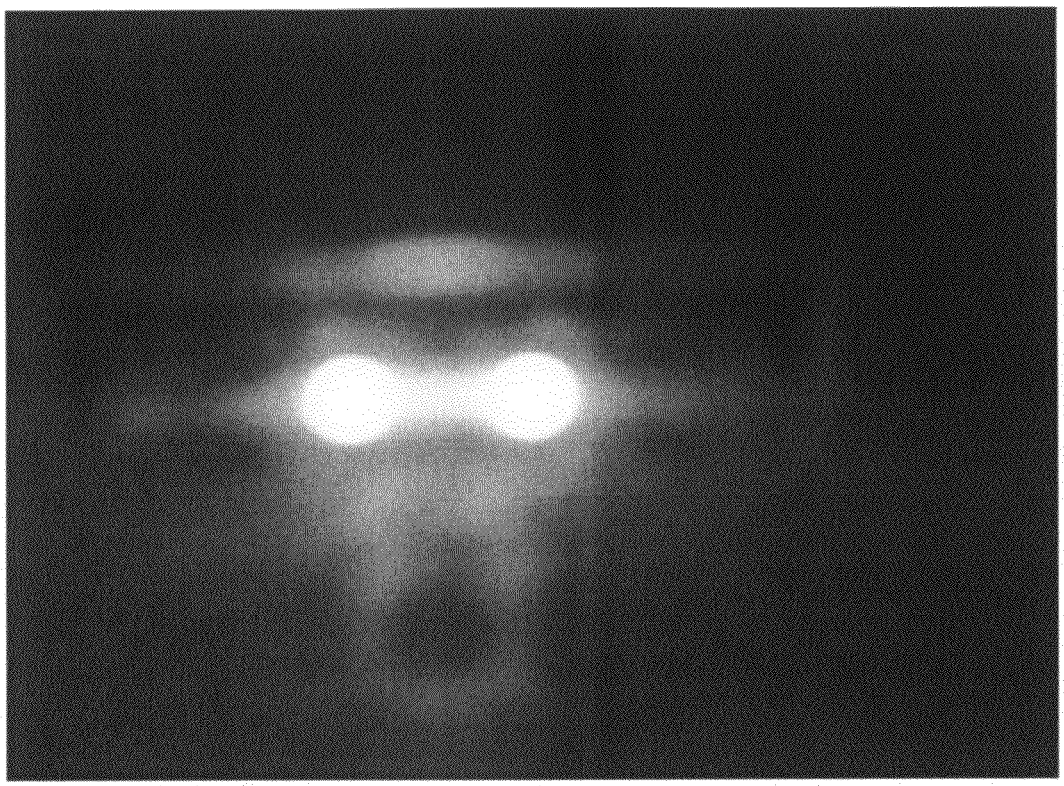
FIG. 12 is a photo showing an illumination distribution testing light of an LED passing the prism sheet in FIG. 11.

FIGS. 5, 6 and 12, reflect the test results from the test conditions in Table 1 As can be seen, light spots formed on the typical prism sheet 10 is relatively strong. In contrast, light spots formed on the optical plate 20 are relatively weak. Therefore, the test results show light emitting from the optical plate 20 is more uniform.

In contrast to the typical prism sheet, the optical plate 20 may be integrally formed by injection molding technology. Injection molding is easier to mass-produce the optical plate 20 over the typical method. Furthermore, since the prism lenses of the typical prism sheet are formed by solidifying melted ultraviolet-cured transparent resin, the prism lenses of the typical prism sheet are easily damaged due to poor rigidity and mechanical strength and scratched. The optical plate 20 has a better rigidity and mechanical strength than the typical prism sheet.

The light sources 22 may be point light sources such as light emitting diodes or linear light sources such as cold cathode fluorescent lamps. In the illustrated embodiment, the light sources 22 are closely positioned cold cathode fluorescent lamps.

A light diffusion plate may be positioned between the optical plate 20 and the light sources 22 in the backlight module 200 to further improve a uniform brightness of the backlight module 200.

Figure 7:
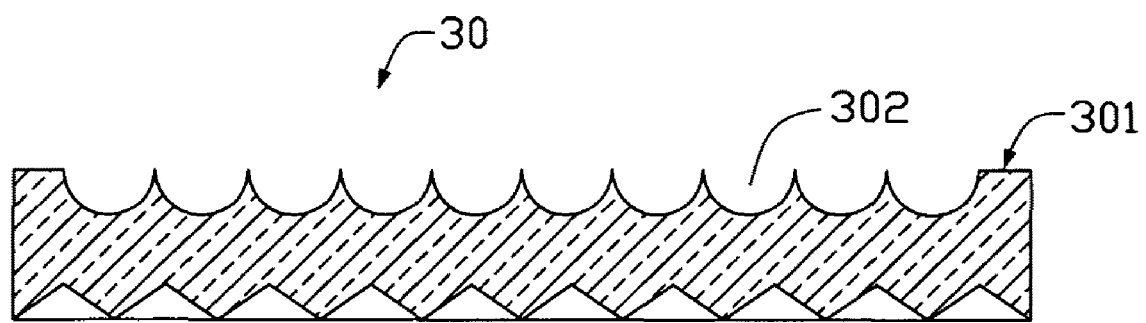
FIG. 7 is a cross-sectional view of the optical plate of a second embodiment of the present disclosure.

Referring to FIG. 7, a second embodiment of an optical plate 30 is similar in principle to the optical plate 20. The first surface 301 defines a plurality of elongated, arc-shaped depressions 302. However, each of the elongated, arc-shaped depressions 302 has a semi-elliptical cross section taken along a direction perpendicular to an extending direction thereof.

Figure 8:
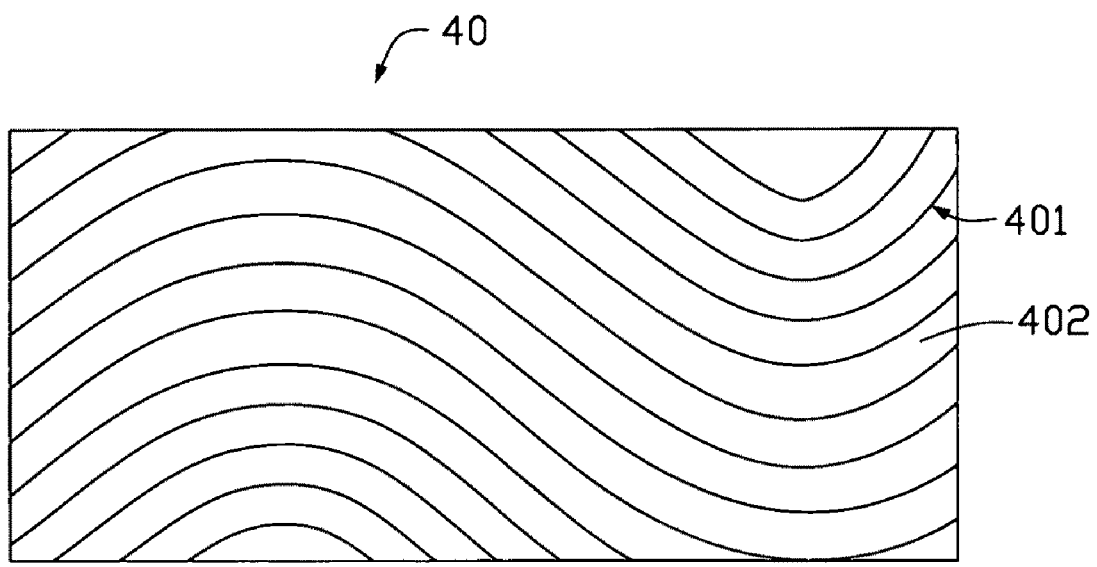
FIG. 8 is a bottom plane view of a third embodiment of an optical plate.

Referring to FIG. 8, a third embodiment of an optical plate 40 is similar in principle to the optical plate 20. The first surface 401 defines a plurality of elongated, arc-shaped depressions 402. However, each of the elongated, arc-shaped depressions 402 extends along an imaginary curved line. Thus moiré patterns, caused by the pixels of a liquid crystal display panel and the structural patterns of a typical prism sheet can be minimized or eliminated.

Figure 9:
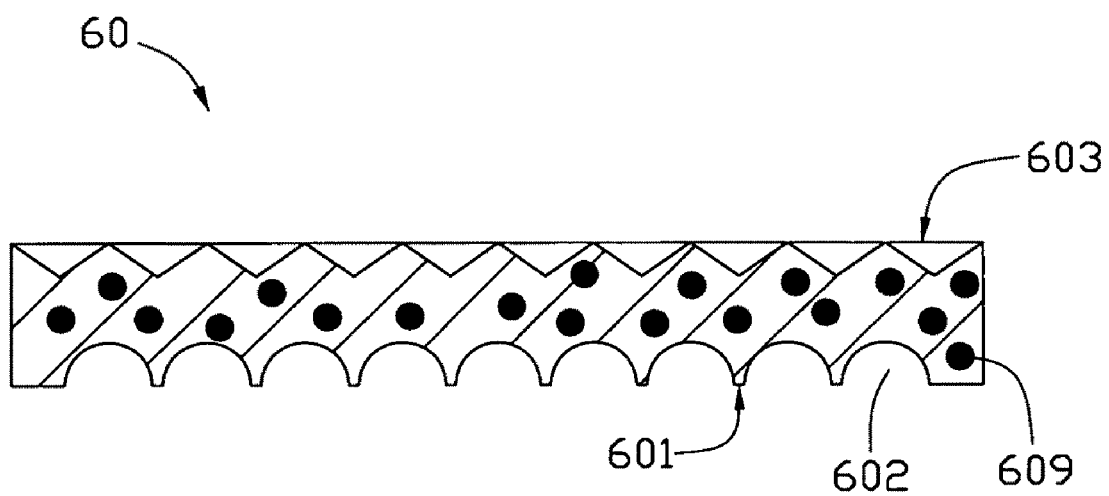
FIG. 9 is a cross-sectional view of a fourth embodiment of an optical plate.
Figure 10:
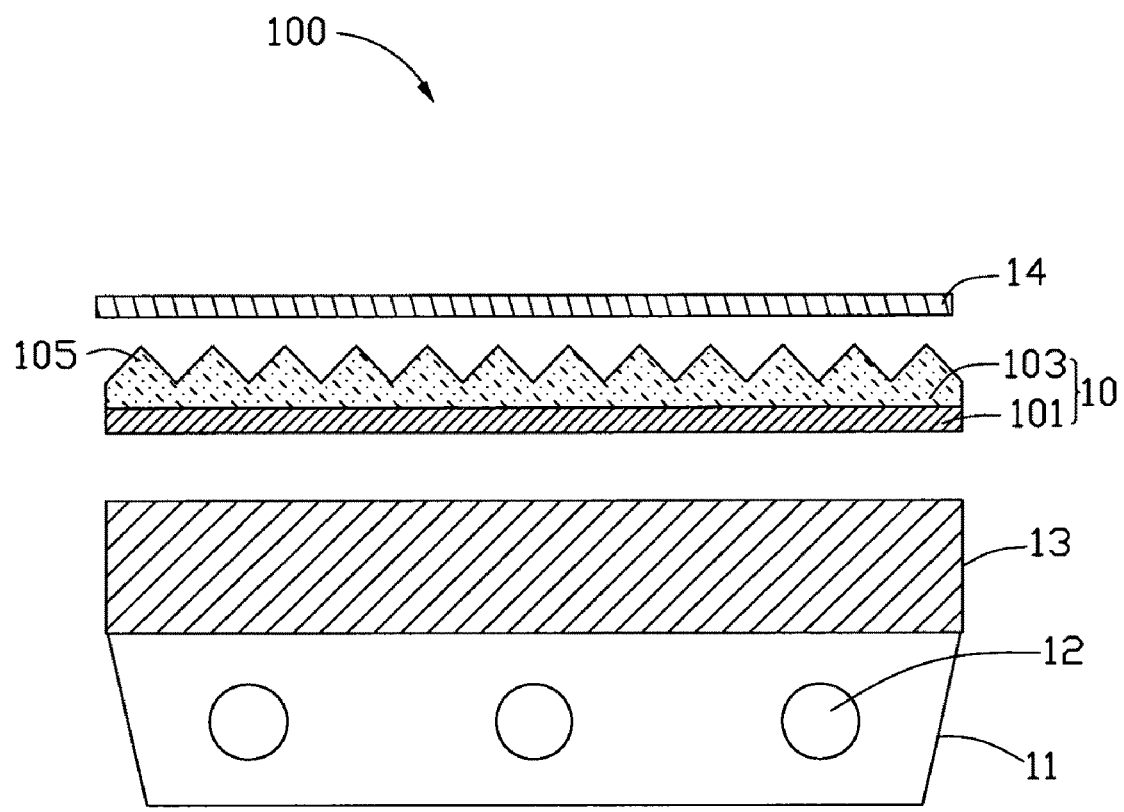
FIG. 10 is an exploded, cross-sectional view of a typical backlight module.
Figure 11:
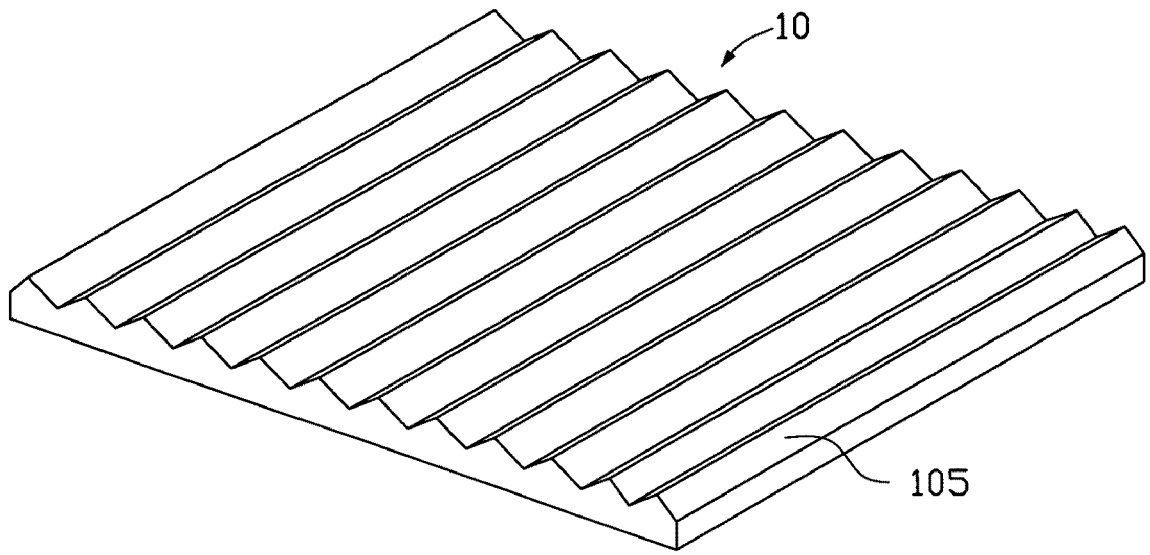
FIG. 11 is an isometric view of a prism sheet of the typical backlight module of FIG. 10.

Referring to FIG. 9, a fourth embodiment of an optical plate 60 is similar in principle to the optical plate 20. The first surface 601 defines a plurality of elongated, arc-shaped depressions 602. The second surface 603 defines a plurality of four-sided pyramidal depressions (not labeled) and a plurality of triangular pyramidal depressions (not shown). Each four-sided pyramidal depression is surrounded by four triangular pyramidal depressions. However, a plurality diffusion particles 609 are embedded the optical plate 60 to further scatter light.

Finally, while various embodiments have been described and illustrated, the embodiments are not to be construed as being limited thereto. Various modifications can be made to the embodiments by those skilled in the art without departing from the true spirit and scope of the present disclosure as defined by the appended claims.

What is claimed is:

1. An optical plate, comprising:
   a first surface defining a plurality of elongated, arc-shaped depressions; and
   a second surface opposite to the first surface, defining a plurality of triangular pyramidal depressions and a plurality of four-sided pyramidal depressions; wherein, each of the four-sided pyramidal depressions has a square base having four corners and four edges, each of the four corners of the square base intersects with another of the corners of the square base of an adjacent four-sided pyramidal depression; each of the four edges of the square base shares a corresponding edge of an adjacent triangular pyramidal depression, such that each four-sided pyramidal depression is surrounded by four triangular pyramidal depressions.

2. The optical plate of claim 1, wherein the second surface forms a plurality of first V-shaped ridges aligned in a first direction, a plurality of second V-shaped ridges aligned in a second direction, and a plurality of third V-shaped ridges aligned in a third direction; the first V-shaped ridges intersect with the second V-shaped ridges thereby forming the four-sided pyramidal depressions, the third V-shaped ridges pass through the intersections of the first V-shaped ridges and the second V-shaped ridges, thereby forming the triangular pyramidal depressions.

3. The optical plate of claim 2, wherein an angle defined by the first direction and the second direction is about 90 degrees.

4. The optical plate of claim 2, wherein an angle defined by the first direction and the third direction is about 45 degrees.

5. The optical plate of claim 2, wherein a top of the first V-shaped ridges, a top of the second V-shaped ridges, and a top of the third V-shaped ridges are in a same plane.

6. The optical plate of claim 2, wherein a vertex angle of the first V-shaped ridges, the second V-shaped ridges, or the third V-shaped ridges is about 80 degrees to about 100 degrees.

7. The optical plate of claim 2, wherein a pitch between adjacent first V-shaped ridges, a pitch between adjacent the second V-shaped ridges, or a pitch between adjacent third V-shaped ridges is about 0.025 mm to about 1 mm.

8. The optical plate according to claim 1, wherein each of the elongated, arc-shaped depressions has one of a semi-elliptical and a semi-circular cross section taken along a direction perpendicular to an extending direction thereof.

9. The optical plate according to claim 8, wherein a radius of a circular arc defined by the semi-circular cross section taken along a direction perpendicular to the extending direction of the elongated, arc-shaped depressions is equal to or lager than 0.01 mm, and less than 3 mm.

10. The optical plate according to claim 1, wherein adjacent elongated, arc-shaped depressions are regularly spaced apart from each other.

11. The optical plate according to claim 1, wherein the elongated, arc-shaped depressions are aligned side by side on the first surface of the optical plate.

12. The optical plate according to claim 1, wherein a pitch between adjacent elongated, arc-shaped depressions is about 0.025 mm to about 1.5 mm.

13. The optical plate according to claim 1, wherein a depth of each elongated, arc-shaped depression is equal to or larger than 0.01 mm, and less than 3 mm.

14. The optical plate of claim 1, further comprising a plurality diffusion particles embedded therein.

15. The optical plate of claim 1, wherein each of the elongated, arc-shaped depressions extends along an imaginary curved line.

16. The optical plate of claim 1, wherein the optical plate is made of a material selected from the group consisting of polycarbonate, polymethyl methacrylate, polystyrene, copolymer of methylmethacrylate and styrene, and combination thereof.

17. A backlight module comprising:
   a frame;
   a plurality of light sources positioned in an inner side of the frame; and
   an optical plate positioned on the frame above the light sources, comprising:
   a first surface and a second surface opposite to the first surface, wherein the first surface defines a plurality of elongated, arc-shaped depressions; the second surface defines a plurality of triangular pyramidal depressions and a plurality of four-sided pyramidal depressions; each of the four-sided pyramidal depressions has a square base having four corners and four edges, each of the four corners of the square base intersects with another of the corners of the square base of an adjacent four-sided pyramidal depression; each of the four edges of the square base shares a corresponding edge of an adjacent triangular pyramidal depression, such that each four-sided pyramidal depression is surrounded by four triangular pyramidal depressions.

18. The backlight module of claim 17, wherein the optical plate is positioned on the frame such that the first surface faces the light sources.

* * * * *